Aug. 1, 1939. L. E. LOVETT 2,167,662
REEL
Filed April 29, 1936 2 Sheets-Sheet 1
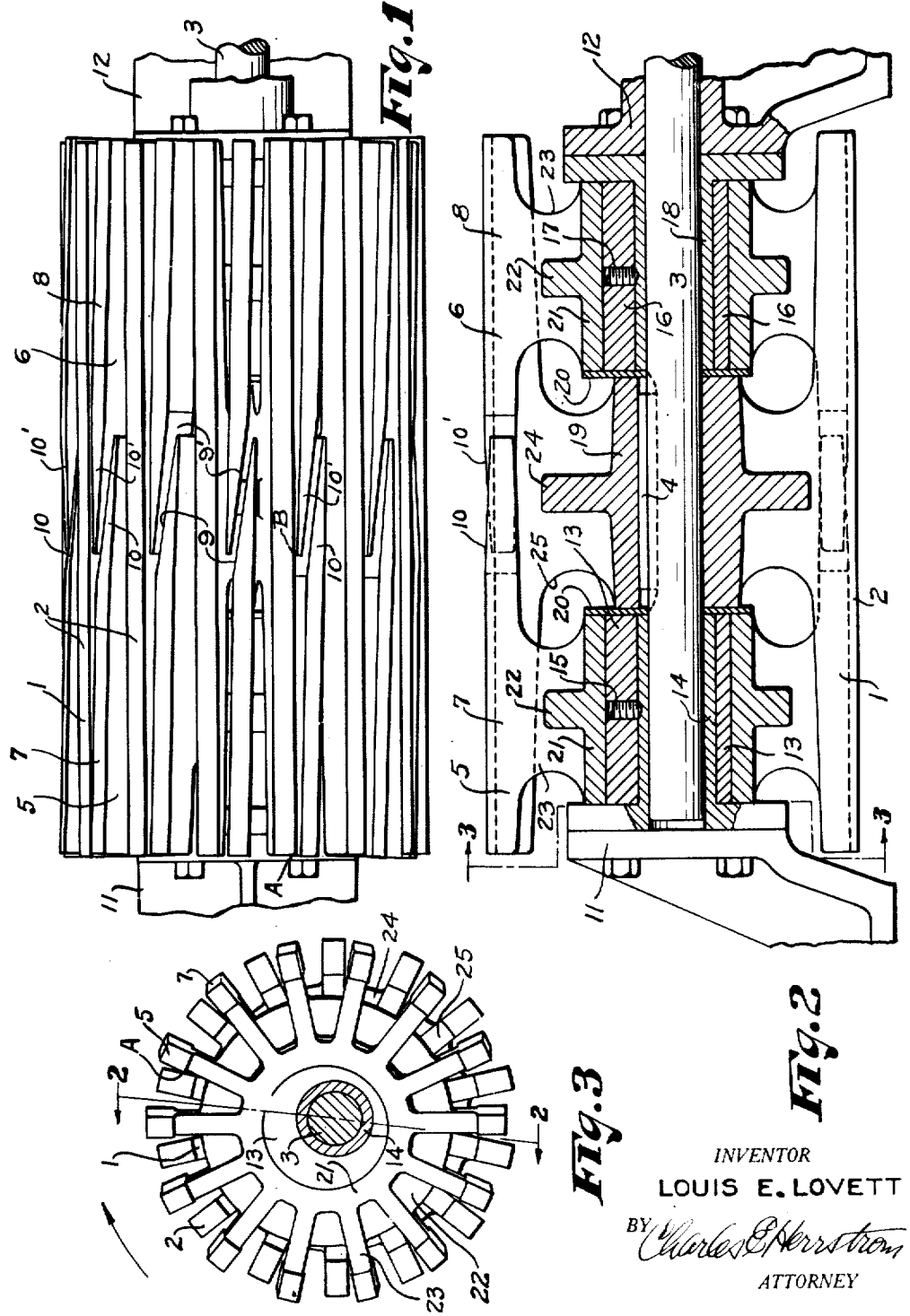
INVENTOR
LOUIS E. LOVETT
BY *Charles E Herrstrom*
ATTORNEY

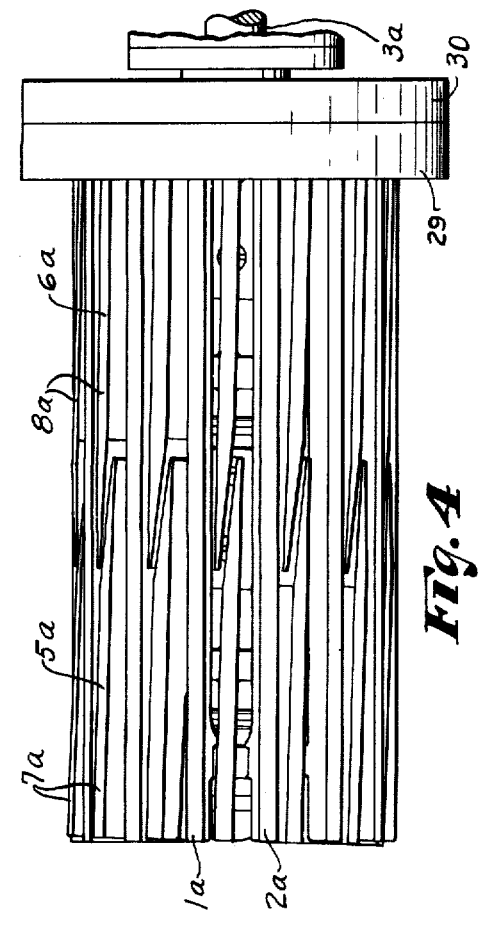
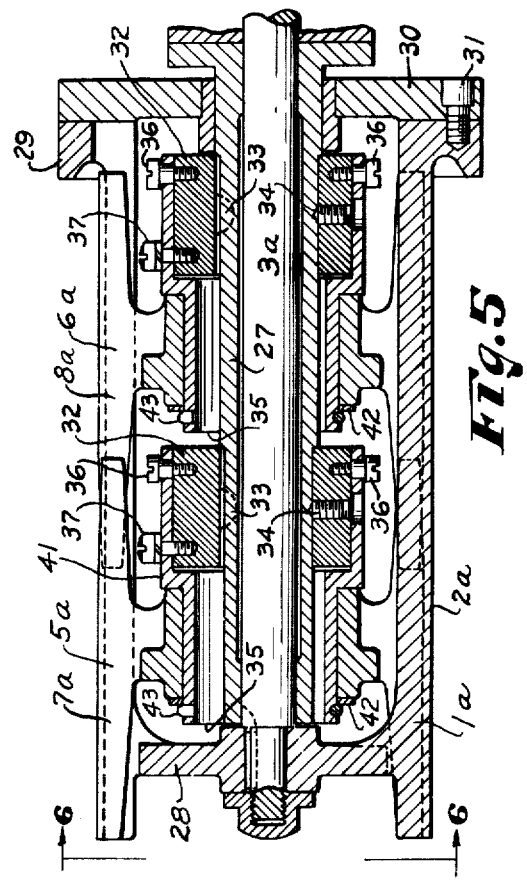
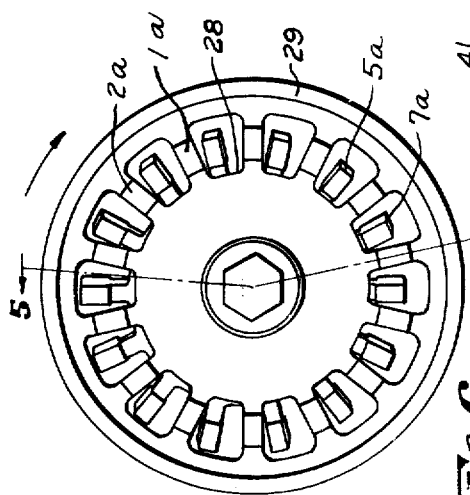
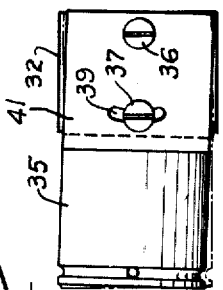

Patented Aug. 1, 1939

2,167,662

UNITED STATES PATENT OFFICE 2,167,662

REEL

Louis E. Lovett, Cleveland Heights, Ohio, assignor to Industrial Rayon Corporation, Cleveland, Ohio, a corporation of Delaware Application April 29, 1936, Serial No. 76,996

12 Claims. (Cl. 242—53)

This invention concerns a novel form of winding reel.

More particularly, the invention relates to a winding reel comprising a generally cylindrical set of spaced, longitudinally extending bar members between which are disposed the individual bar members of another generally cylindrical set of spaced, longitudinally extending bar members. In winding reels of the kind to which the invention relates, the sets of bar members are preferably in askew relation to each other and so mounted that during rotation of the reel as a whole material, such as thread or the like, wound on the reel is transferred from one set of bar members to the other. In consequence of the askew relation between the sets of bar members, the thread or the like is caused to advance longitudinally of the reel.

Winding reels of this general type are shown, described and claimed in British Patent No. 413,414, which corresponds to an application of Walter F. Knebusch identified as Serial No. 652,089, filed January 16, 1933.

The reel illustrated in said prior application consists of two wholly rigid, generally cylindrical reel members, the periphery of each of which is made up of a plurality of spaced, longitudinally extending bar members. The bar members of the two reel members interdigitate, those of one reel member alternating with those of the other. The reel members are rotatably mounted about axes which are offset from and inclined to each other, but so disposed that the axis of each reel member is contained within the cylindrical boundary of the other reel member. The offset and inclined relation of the reel members causes thread or the like wound on the reel to advance longitudinally of the reel in the form of spaced, generally helical turns.

It is apparent that in reels of this kind the length of a given reel is limited by possible interference between adjacent bar members, such interference resulting if the bar members exceed a length dependent, among other things, upon the amount of inclination, the spacing between the bar members, and the number of bar members in each set. On one hand, it is desirable that the bar members be as close together and their number as large as reasonably possible, since a periphery is thereby obtained that is more nearly cylindrical and the thread or the like is supported at a greater number of points; while on the other hand, a relatively large number of bar members and closeness of spacing increase the possibility of interference between the bar members. The present invention particularly seeks to minimize these difficulties by providing a reel which is not limited as to length by factors correlating with the amount of the inclination.

Briefly stated, the invention eliminates interference between adjacent bar members by employing, in lieu of one or the other of the two conventionally disposed sets of longitudinally extending bar members ordinarily used, a plurality of opposed sets of longitudinally extending bar members each of which is short in relation to the overall length of the reel. The latter sets of bar members are so mounted that the individual pairs of opposed bar members thereof are disposed between the bar members of the conventional set of bar members, the same extending in the usual way for substantially the full length of the reel. The relatively short sets of bar members are mounted in askew relation to the relatively long set of bar members. The bar members of the opposed relatively short sets of bar members are not long enough to cause interference, yet taken together suffice to cause advance of the thread or the like from one end of the reel to the other.

In the drawings, in which are shown two different embodiments of the invention, Figure 1 is a plan of one form of reel embodying the invention, said reel being supported at both ends. Figure 2 is a longitudinal sectional elevation thereof from line 2—2 of Figure 3. Figure 3 is an end elevation from line 3—3 of Figure 2. Figure 4 is a plan of another form of reel embodying the invention, said reel being of cantilever construction. Figure 5 is a corresponding longitudinal sectional elevation from line 5—5 of Figure 6. Figure 6 is an end elevation from line 6—6 of Figure 5. Figure 7 is a plan view of means which may be provided for adjusting the inclination in the reel of Figures 4, 5 and 6. Figure 8 is an end elevation of the device of Figure 7.

In the drawings, like reference numerals refer to like parts throughout.

The reel shown in Figures 1, 2 and 3 embraces a rigid, generally cylindrical reel member 1 the periphery of which comprises a plurality of spaced, longitudinally extending, relatively long bar members 2 mounted concentrically upon and for rotation with a drive shaft 3, as, for example, by a key 4. A plurality, two in the embodiment illustrated, of rigid, generally cylindrical eccentric reel members 5 and 6, the respective peripheries of which comprise spaced, longitudinally extending, relatively short bar members 7 and 8, are rotatably mounted in end to end relation about independent axes slightly inclined to the axis of the concentric reel member 1. The bar members of eccentric reel members 5 and 6 are short enough, taking into account the number of bar members, the spacing of bar members and the amount of inclination, to prevent any interference with the bar members 2 of concentric reel member 1.

The axes of eccentric reel members 5 and 6, in order to insure advance of the thread or the like in the same direction throughout the length of the reel, are inclined in the same direction and are preferably disposed in a common plane offset slightly from the axis of concentric reel member 1. If a uniform advance of the thread or the like throughout the length of the reel is desired, the axes of the eccentric reel members should preferably, but otherwise need not, be parallel to each other.

Eccentric reel members 5 and 6 and concentric reel member 1 are therefore closely associated in the sense that they occupy and rotate in substantially the same space.

The effect of mounting eccentric reel members 5 and 6 about independent axes each inclined to that of concentric reel member 1 is apparent from Figure 1. As can be seen therefrom, bar members 7 and 8 of eccentric reel members 5 and 6 are in a sense in offset relation to each other. Since bar members 7 and 8 are relatively short, there is no interference between them and bar members 2 of concentric reel member 1. The reel, however, may be as long as desired, so long as there is provided a suitable number of relatively short eccentric reel members each disposed about an axis askew to that of the concentric reel member 1.

Adjacent ends of the bar members 7 and 8 of opposed eccentric reel members 5 and 6 should preferably be adapted to provide continuous support for the thread or the like wound on the reel and being advanced longitudinally thereof. For this purpose, bar members 7 and 8 may overlap as shown, the contiguous sides 9 and 9' of bar members 7 and 8, respectively, being tapered to prevent interference therebetween. Furthermore, the thread-supporting surfaces of the overlapping portions of bar members 7 and 8 are preferably gradually tapered as indicated at 10 and 10', respectively, to allow the thread or the like as it travels longitudinally of the reel to be transferred gradually from the bar members of one eccentric reel member to those of the other.

The reel illustrated in Figures 1, 2 and 3 is supported from both ends thereof by frame members 11 and 12. Eccentric reel bushing 13 has a geometrical axis offset from and inclined to the axis of a cylindrical bore therein which cylindrical bore receives a sleeve 14 carried by frame member 11. Bushing 13 may be held in position by suitable means such as set-screw 15. Eccentric reel member 6 may be similarly mounted in the desired position on a similar bushing 16 which is rigidly mounted, as by a set-screw 17, on a sleeve portion 18 mounted on frame member 12. The hub 19 of concentric reel member 1 is disposed on drive shaft 3 between the sleeve portions 14 and 18, suitable washers 20 being furnished if desired to provide bearing surfaces between hub 19 and the ends of the eccentric reel members 5 and 6.

While reel members 1, 5 and 6 may be of any of various suitable constructions, each is shown as a reinforced construction lending itself to manufacture by casting and molding operations.

Thus each of eccentric reel members 5 and 6 comprises a hub portion 21 concentric with the periphery of the member as a whole, a spider 22, and reinforcing ribs 23 on which the bar members are mounted. Concentric reel member 1 similarly comprises hub 19, spider 24 and reinforcing ribs 25 which support the bar members 2.

In operation, concentric reel member 1 is rotated, as by means of shaft 3. Eccentric reel members 5 and 6 are driven by contact of their bar members 7 and 8 with the bar members 2 of concentric reel member 1. In the reel illustrated, this contact takes place, when the bar members 7 and 8 are in the position shown, at the points A and B. As shown in Figure 3, the displacement of the axes of eccentric reel members 5 and 6 laterally of the axis of concentric reel member causes the bar members 7 and 8 of these reel members to project outward beyond the bar members 2 of concentric reel member 1 during part of a complete revolution of the reel and bar members 2 of the concentric reel member 1 to project outward beyond those of eccentric reel members 5 and 6 through the other part of the revolution.

Thread or the like wound on the reel is thus transferred during rotation of the reel from the bar members of concentric reel member 1 to the bar members of one or the other of eccentric reel members 5 and 6, depending on the position of the particular turn of the thread or the like on the reel.

The inclination of eccentric reel members 5 and 6 with respect to concentric reel member 1 produces bodily advance of the portions of the thread or the like which are carried by them during that portion of the revolution of the reel during which their bar members support the thread or the like. It will be understood that the turns of thread or the like will move, for a given direction of rotation of the reel and for a given direction of lateral displacement of the axes of eccentric reel members 5 and 6, in a direction along the reel determined by the direction of inclination of the axes of eccentric reel members 5 and 6 with respect to the axis of concentric reel member 1. It is obvious that the general direction of inclination of eccentric reel members 5 and 6 should be the same if an advance of the thread or the like in the same direction along the entire length of the reel is desired; further, as the inclination is modified, that the pitch or lead of the generally helical turns of thread or the like is modified.

In this embodiment of the invention, for direction of rotation indicated by the arrow in Figure 3, the thread or the like will advance along the reel from right to left. As previously indicated, a longitudinally continuous support for the turns of thread or the like is provided by contiguous tapered portions 9 and 9' of ends of bar members 7 and 8 of the eccentric reel members 5 and 6. The net effect is to cause thread or the like to be wound turn after turn around the reel in substantialy helical form, the succession of turns meanwhile advancing bodily toward the other end of the reel. In this manner, thread or the like led to the reel can be stored upon it in the form of a large number of closely spaced turns, as many as several hundred, depending upon the length of the reel. This capacity for continuously but temporarily storing a relatively long length of thread or the like in a small space lends itself advantageously to the employment of such reels in the continuous processing of thread or the like.

Although, in the reel of the above described embodiment of the invention, the relatively short eccentric members 5 and 6 are shown in fixed offset and inclined relation with respect to concentric member 1, they may, if desired, be so mounted that the inclination of at least one thereof may be modified, thus permitting the lead or pitch of the turns of the thread to be varied. For instance, one or more of the eccentric reel members 5 and 6 of said reel may be supported by an adjustable mounting, as is each of the eccentric reel members 5a and 6a of the reel shown in Figures 4, 5 and 6. The reel of these figures is of cantilever construction; that is, it is supported and driven from one end only, the other end being free of any projecting parts for driving or supporting the reel, etc. Reels of cantilever construction are advantageously employed in certain arrangements of reels in apparatus for the continuous processing of thread or the like.

In the reel illustrated in Figures 4, 5 and 6, which forms the subject matter of application Serial No. 235,326, filed October 17, 1938, for "Cantilever winding reel," the eccentric reel members 5a and 6a are adjustably supported on a frame member 27 in which the drive shaft 3a is journalled. Concentric reel member 1a is mounted on and driven from one end of drive shaft 3a, the other end of concentric reel member 1a being journalled on frame member 27. Concentric reel member 1a in the modification illustrated in Figures 4, 5 and 6 embodies a spider 28 at the driven end of member 1a on which spider are mounted the bar members 2a of concentric reel member 1a. Bar members 2a are supported at the other end of concentric reel member 1a by an exterior ring-like portion 29 which is fastened to an annular supporting member 30 as by bolts 31, member 30 being rotatably supported on frame member 27. The exterior ring-like portion 29 may serve to reinforce the bar members as well as to guide thread onto the reel.

As shown in Figures 7 and 8, the adjusting means for each eccentric reel member 5a and 6a may comprise a supporting member 32 which is demountably disposed on frame member 27 as by a key 33 and set-screw 34. The supporting member 32 may be so formed that it provides the desired offset relationship for the eccentric reel member carried thereby. The bushing 35, on which the corresponding eccentric reel member 5a or 6a is rotatably mounted, is pivotally mounted on supporting member 32, as by cap-screws 36. Cap-screw 37, which is threaded into supporting member 32 and which is disposed in a suitably formed groove 39 in the supporting bracket 41 for bushing 35, permits angular adjustment of the bushing 35 as indicated in Figure 7.

It is obvious that the amount of inclination for both eccentric reel members 5a and 6a may be made the same, in which case the lead of the thread will be the same along the entire length of the reel; also, that the degree of inclination may be different for the eccentric reel members 5a and 6a, in which case the lead or pitch of the thread or the like will be different at different parts of the reel. This may be advantageous in cases where more than one processing treatment is applied to the thread or the like at intervals along the reel, since it may be desired to subject the thread to a given processing treatment for a longer period than to others.

In the apparatus illustrated, eccentric reel members 5a and 6a are maintained in proper relationship on the bushing members 35 by means of washers 42 held in place by spring clips 43. As in the embodiment of Figures 1, 2 and 3, it is obvious that reel members 1a, 5a and 6a may, as indicated by the construction illustrated, be of cast or molded form. Furthermore, as in said previously described embodiment, adjacent ends of bar members of the opposed eccentric members 5a and 6a may be adapted, as by tapering, to provide a continuous support for the thread or the like being advanced longitudinally of the reel. When drive shaft 3a is rotated, concentric reel member 1a fixed thereto rotates therewith and contact of the bars 2a of said concentric reel member 1a with bar members 7a and 8a of eccentric reel members 5a and 6a causes them to rotate, all as in the previously described reel.

For the direction of rotation indicated by the arrows in Figure 6, the turns of thread or the like will be advanced from right to left in Figure 4 or 5 or, in other words, from the supported end toward the unsupported end of the reel.

It is obvious that more than two eccentric reel members may be provided for each reel, only two being shown in each of the illustrated embodiments. Thus in the embodiment of Figures 1, 2 and 3, two or more eccentric reel members may be mounted on each of the sleeve members 14 or 18, each of which corresponds generally to the frame member 27 of the embodiment of Figures 4, 5 and 6. In the cantilever reel of Figures 4, 5 and 6, more than two eccentric reel members may be mounted on frame member 27. If desired, the relation of the concentric and eccentric reel members may be reversed, so that in the apparatus of Figures 1, 2 and 3 reel member 1 rather than reel members 5 and 6 may be eccentric to the axis of the reel as a whole.

It will be understood from the foregoing that the embodiments shown are purely illustrative and that various modifications may be made therein without in any way departing from the spirit of the invention.

It should also be understood that the term "generally cylindrical" as employed in connection with the reel members in the recitation in the appended claims of the features of the invention is not used in its geometric sense, but is intended to include, in addition to contours of the order of that illustrated, other contours which may be said to be characterized by cross-sections that are generally circular. Except insofar as the same may be comprehended by generic claims, no claim is made to the subject matter of Figures 4 to 8, inclusive, which subject matter is shown, described and claimed in Samerdyke application Serial No. 235,326 for "Cantilever winding reel."

It is intended that the patent shall cover, by suitable expression in the appended claims, whatever features of patentable novelty reside in the invention.

What is claimed is:

1. Reel mechanism comprising a reel member made up of longitudinally extending bar members; a plurality of reel members made up of longitudinally extending bar members extending generally longitudinally of and so disposed as to alternate with the bar members of said first-mentioned reel member, said last mentioned reel members being arranged in end-to-end relation; means rotatably mounting said first-mentioned reel member; and means rotatably mounting said last-mentioned reel members so that their axes are mutually non-coincident and are offset from and inclined to the axis of said first-mentioned reel member, whereby thread or the like will be advanced in a series of generally helical turns lengthwise of the reel mechanism as a whole.

2. Reel mechanism according to claim 1 in which the angle of inclination of the axis of one of said last-mentioned reel members with respect to the axis of said first-mentioned reel member is different from the angle of inclination of the axis of another of said last-mentioned reel members with respect to the axis of said first-mentioned reel member.

3. Reel mechanism according to claim 1 in which said last-mentioned reel members together are substantially coextensive in length with said first-mentioned reel member.

4. Reel mechanism according to claim 1 in which the axes of said last-mentioned reel members are disposed in a common plane parallel to the axis of said first-mentioned reel member.

5. Reel mechanism comprising a reel member embodying a plurality of circumferentially spaced, longitudinally extending bar members; a plurality of reel members extending generally longitudinally thereof arranged in end-to-end relation, each of said last-mentioned reel members embodying a plurality of circumferentially spaced, longitudinally extending bar members alternating with the bar members of said first-mentioned reel member; and means rotatably mounting the several reel members so that the axes of said last-mentioned reel members are mutually non-coincident and are inclined to the axis of said first-mentioned reel member, whereby thread or the like will be advanced in a series of generally helical turns lengthwise of the reel mechanism as a whole.

6. Reel mechanism according to claim 5 in which said last-mentioned reel members together with its associated bar members, is formed as a rigid unit.

7. Reel mechanism according to claim 5 in which each of said last-mentioned reel members, together with its associated bar members, is formed as a rigid unit.

8. Reel mechanism according to claim 5 in which the angle of inclination of one of said last-mentioned reel members with respect to said first-mentioned reel member is different from the angle of inclination of another of said last-mentioned reel members with respect to said first-mentioned reel member.

9. Reel mechanism comprising a generally cylindrical set of spaced, longitudinally extending bar members; a plurality of generally cylindrical sets of spaced, longitudinally extending bar members extending generally longitudinally thereof, said last-mentioned sets of bar members being in end-to-end relation; means for supporting said first-mentioned set of bar members about an axis of rotation; and means for supporting said last-mentioned sets of bar members respectively about axes of rotation which are mutually non-coincident and are offset from and inclined to the axis of said first-mentioned set of bar members, the bars members of said last-mentioned sets being disposed in alternating relation to the bar members of said first-mentioned set and cooperating therewith to advance thread or the like in a series of generally helical turns lengthwise of the reel mechanism as a whole.

10. Reel mechanism according to claim 9 in which the contiguous ends of said last-mentioned sets of bar members overlap to provide continuous longitudinal support for the thread or the like.

11. Reel mechanism according to claim 9 in which the opposed faces of contiguous ends of said last-mentioned sets of bar members are tapered to prevent interference therebetween.

12. Reel mechanism according to claim 9 in which the peripheral surfaces of contiguous ends of said last-mentioned sets of bar members are oppositely tapered to facilitate advance of the thread or the like from one to another of said last-mentioned sets of bar members.

LOUIS E. LOVETT.

CERTIFICATE OF CORRECTION.

Patent No. 2,167,662. August 1, 1939.

LOUIS E. LOVETT.

It is hereby certified that error appears in the printed specification of the above numbered patent requiring correction as follows: Page 1, second column, line 4, strike out "the" second occurrence; page 2, second column, line 8, for "members" read member; page 4, first column, line 40, claim 6, for the words "last-mentioned reel members" read first-mentioned reel member; and that the said Letters Patent should be read with this correction therein that the same may conform to the record of the case in the Patent Office.

Signed and sealed this 5th day of September, A. D. 1939.

Henry Van Arsdale, (Seal) Acting Commissioner of Patents.

are mutually non-coincident and are offset from and inclined to the axis of said first-mentioned reel member, whereby thread or the like will be advanced in a series of generally helical turns lengthwise of the reel mechanism as a whole.

2. Reel mechanism according to claim 1 in which the angle of inclination of the axis of one of said last-mentioned reel members with respect to the axis of said first-mentioned reel member is different from the angle of inclination of the axis of another of said last-mentioned reel members with respect to the axis of said first-mentioned reel member.

3. Reel mechanism according to claim 1 in which said last-mentioned reel members together are substantially coextensive in length with said first-mentioned reel member.

4. Reel mechanism according to claim 1 in which the axes of said last-mentioned reel members are disposed in a common plane parallel to the axis of said first-mentioned reel member.

5. Reel mechanism comprising a reel member embodying a plurality of circumferentially spaced, longitudinally extending bar members; a plurality of reel members extending generally longitudinally thereof arranged in end-to-end relation, each of said last-mentioned reel members embodying a plurality of circumferentially spaced, longitudinally extending bar members alternating with the bar members of said first-mentioned reel member; and means rotatably mounting the several reel members so that the axes of said last-mentioned reel members are mutually non-coincident and are inclined to the axis of said first-mentioned reel member, whereby thread or the like will be advanced in a series of generally helical turns lengthwise of the reel mechanism as a whole.

6. Reel mechanism according to claim 5 in which said last-mentioned reel members together with its associated bar members, is formed as a rigid unit.

7. Reel mechanism according to claim 5 in which each of said last-mentioned reel members, together with its associated bar members, is formed as a rigid unit.

8. Reel mechanism according to claim 5 in which the angle of inclination of one of said last-mentioned reel members with respect to said first-mentioned reel member is different from the angle of inclination of another of said last-mentioned reel members with respect to said first-mentioned reel member.

9. Reel mechanism comprising a generally cylindrical set of spaced, longitudinally extending bar members; a plurality of generally cylindrical sets of spaced, longitudinally extending bar members extending generally longitudinally thereof, said last-mentioned sets of bar members being in end-to-end relation; means for supporting said first-mentioned set of bar members about an axis of rotation; and means for supporting said last-mentioned sets of bar members respectively about axes of rotation which are mutually non-coincident and are offset from and inclined to the axis of said first-mentioned set of bar members, the bars members of said last-mentioned sets being disposed in alternating relation to the bar members of said first-mentioned set and cooperating therewith to advance thread or the like in a series of generally helical turns lengthwise of the reel mechanism as a whole.

10. Reel mechanism according to claim 9 in which the contiguous ends of said last-mentioned sets of bar members overlap to provide continuous longitudinal support for the thread or the like.

11. Reel mechanism according to claim 9 in which the opposed faces of contiguous ends of said last-mentioned sets of bar members are tapered to prevent interference therebetween.

12. Reel mechanism according to claim 9 in which the peripheral surfaces of contiguous ends of said last-mentioned sets of bar members are oppositely tapered to facilitate advance of the thread or the like from one to another of said last-mentioned sets of bar members.

LOUIS E. LOVETT.

CERTIFICATE OF CORRECTION.

Patent No. 2,167,662.       August 1, 1939.

LOUIS E. LOVETT.

It is hereby certified that error appears in the printed specification of the above numbered patent requiring correction as follows: Page 1, second column, line 4, strike out "the" second occurrence; page 2, second column, line 8, for "members" read member; page 4, first column, line 40, claim 6, for the words "last-mentioned reel members" read first-mentioned reel member; and that the said Letters Patent should be read with this correction therein that the same may conform to the record of the case in the Patent Office.

Signed and sealed this 5th day of September, A. D. 1939.

Henry Van Arsdale, (Seal)            Acting Commissioner of Patents.